United States Patent [19]

Lingl

[11] 4,155,467
[45] May 22, 1979

[54] GROUPING AND STACKING SYSTEMS FOR FORMING TIED STACKS OF BLOCK-LIKE ARTICLES

[75] Inventor: Hans Lingl, Paris, Tenn.

[73] Assignee: Lingl Corporation, Paris, Tenn.

[21] Appl. No.: 846,937

[22] Filed: Oct. 31, 1977

[51] Int. Cl.² ............................................. B65G 57/03
[52] U.S. Cl. ........................................ 414/41; 414/54; 414/62; 414/786
[58] Field of Search .......... 214/6 A, 6 P, 152, 10.5 R, 214/10.5 S; 198/374, 434

[56] References Cited

U.S. PATENT DOCUMENTS

| | | | |
|---|---|---|---|
| 2,955,717 | 10/1960 | Segur et al. | 214/6 A |
| 3,262,584 | 7/1966 | Hayford, Jr. et al. | 214/6 A |
| 3,669,283 | 6/1972 | Brown, Jr. | 198/374 X |
| 3,939,993 | 2/1976 | Lingl, Jr. | 214/6 A |
| 4,014,441 | 3/1977 | Osborn et al. | 214/10.5 S |
| 4,067,456 | 1/1978 | Schmitt | 214/6 P |

FOREIGN PATENT DOCUMENTS 1077421  7/1967  United Kingdom .................... 214/6 A Primary Examiner—Frank E. Werner
Attorney, Agent, or Firm—Cushman, Darby & Cushman

[57] ABSTRACT

Apparatus and method are disclosed for forming tied stacks of block-like objects wherein the blocks are first placed on either one of two independent grouping systems. These first and second grouping systems then supply respectively corresponding grouped blocks to a marshalling area, where successive layers of the stacks are formed in different respective orientations. The successively formed layers are then lifted and stacked one on top of the other. The controls for the apparatus are such that at least two different interlocking patterns of blocks may be formed in the marshalling area by controlling the number of blocks taken from each grouping system and also controlling placement of the blocks in the marshalling area, so that a properly tied stack results.

20 Claims, 5 Drawing Figures

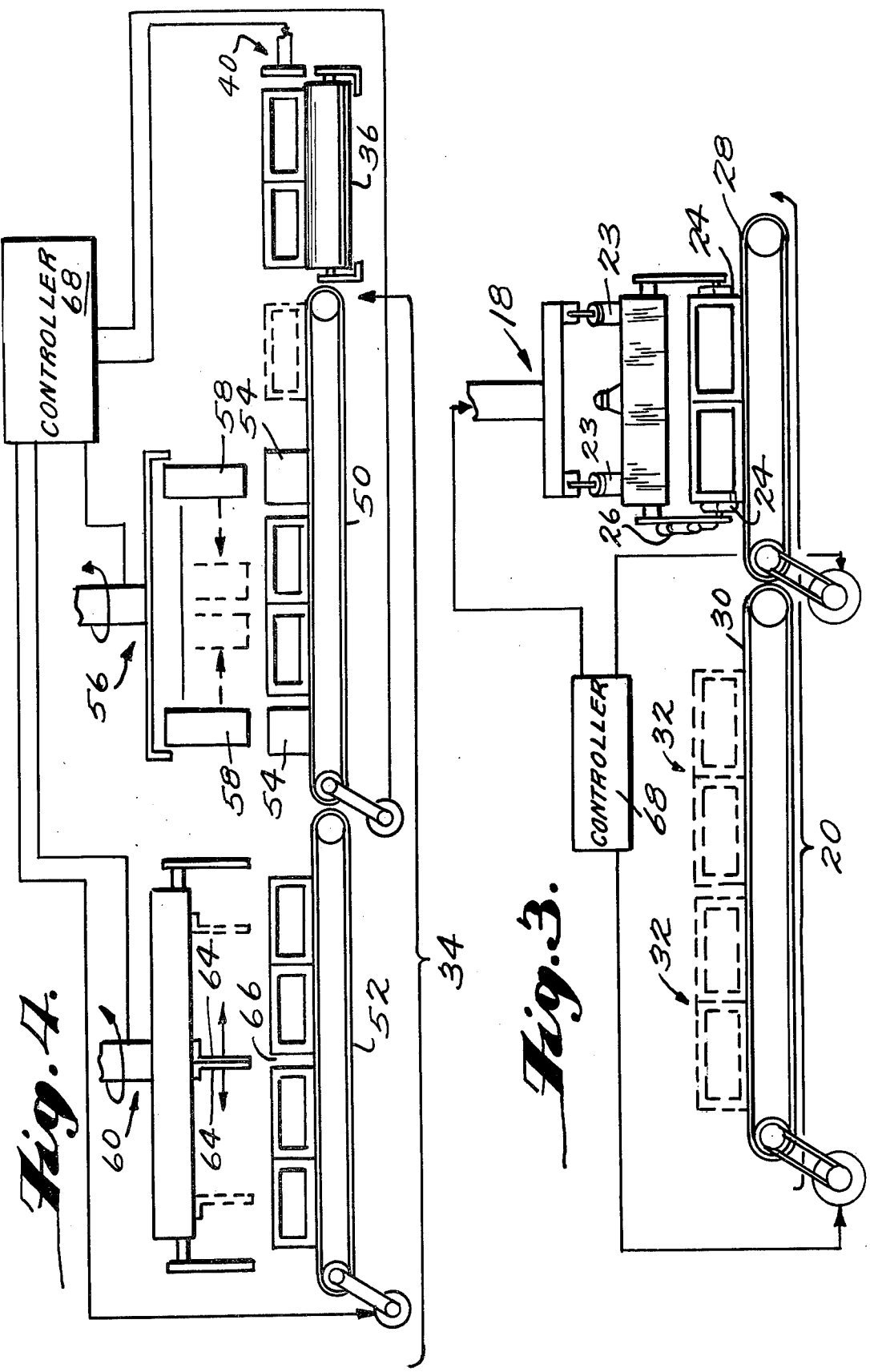

GROUPING AND STACKING SYSTEMS FOR FORMING TIED STACKS OF BLOCK-LIKE ARTICLES

BACKGROUND OF THE INVENTION

This application relates generally to apparatus and method for the automatic depalletization, grouping and stacking of block-like objects, for example, concrete blocks. Blocks of at least two different orientations are placed in each layer of the stack so that the resulting stack is properly integrated and "tied" for structural stack integrity. In a "tied" stack, each layer of subunits is adjacent to layers of differing block patterns, so that contiguous blocks within each layer are held together due to frictional forces exerted by overlapping blocks in adjacent layers.

In particular, this invention relates to apparatus and method which, if necessary, first rotates the blocks so that a solid face is directed upward, and then moves a supply of blocks to each of two independent grouping systems. Each grouping system independently supplies blocks, in a respectively corresponding one of the two angular orientations used in forming a tied stack, to a marshalling area wherein the layers of the stack are formed. The successively formed layers are then lifted and stacked onto one another. In this invention, the layers of the stack and the stack itself are preferably formed so as to minimize the movement of the blocks and the time needed to form the stack.

Automatic depalletizers and stackers for concrete blocks are known in the industry. Some of these stackers are equipped with grippers, with or without rotating gripper pads, which take blocks off the pallets and place them on grouping conveyor systems so that flats (i.e., stack layers) may be assembled. The conveyor system may be operated according to U.S. Pat. No. 3,625,375 to Johann Lingl, issued Dec. 7, 1971 so as to provide spacing between groups of blocks. In other systems, a gripper places blocks on a table from which they are pushed onto another table consisting of two plates which, as flats are accumulated, are separated so that spaces are provided in the flat for insertion of the tongues of a stacking gripper, which successively lifts the flats onto a stack. Neither of these prior systems permit tied stacking wherein the blocks within a particular layer has more than one orientation.

Systems are also known for producing tied stacks where single rows of blocks are placed onto a conveyor system on which they are rotated so that the proper face is upward and from which they are then pushed onto a series of turntables. Blocks are then raked off the turntables so as to form flats with blocks of each row of a flat being oriented differently than blocks in a preceding row. These machines, however, have a very low capacity, since the blocks have to be fed to the accumulating position single file, and because the turning of the blocks requires an additional operating step. A further system is known wherein a single row of blocks is fed into a machine which has turning mechanisms installed over a feed conveyor, which turn one, two, or several blocks in a row at the same time on the conveyor before they proceed into a stacking system. This system also does not permit high capacity processing since only a single row of blocks is fed into the system at a time and because turning requires an additional operating step.

In U.S. Pat. No. 3,625,375, supra, brick flats are set on a first grouping system consisting of two conveyors forming flats of different lengths, wherein every other flat proceeds into a pick-up area for stacking, while alternating flats are transferred with a rotating gripper to another parallel grouping system operating in a manner similar to the first one. In the second system the bricks are regrouped in a different angular orientation to form the alternate layers of the rectangular stacks. The described equipment does not handle headers and stretchers (i.e., blocks having different angular orientations) in the same layer.

A similar system provides for an additional gripper to feed the regrouped bricks from the second grouping system back onto the first grouping system, thus permitting the placement of headers and stretchers in the same layer. This system requires more equipment than the present invention and is therefore more expensive. Also, it is limited in capacity because of the necessity to alternately group layers on the first grouping system, transfer them to a second one, and then return the bricks to the first grouping system.

SUMMARY OF THE INVENTION

The present invention relates to a simple method and apparatus for forming tied stacks in a very high capacity manner. Efficiency is obtained by grouping blocks which will have a first angular orientation in the marshalling area (and later in the flat), in one grouping system, while grouping the blocks which will have a second angular orientation in the marshalling area (and later in the flat), in a second independent grouping system. Also, at each step of the present invention, a large number of blocks is handled simultaneously, thus improving efficiency.

BRIEF DESCRIPTION OF THE DRAWINGS

These and other objectives and advantages of the invention will become more apparent and more readily appreciated from the following detailed description of the presently preferred exemplary embodiment of the invention taken in conjunction with the accompanying drawings, of which:

FIG. 3 is a sectional view taken along the 3—3 line of FIG. 1; FIG. 4 is a sectional view taken along the 4—4 line of FIG. 1;

DESCRIPTION OF THE PREFERRED EMBODIMENTS

Figure 1:
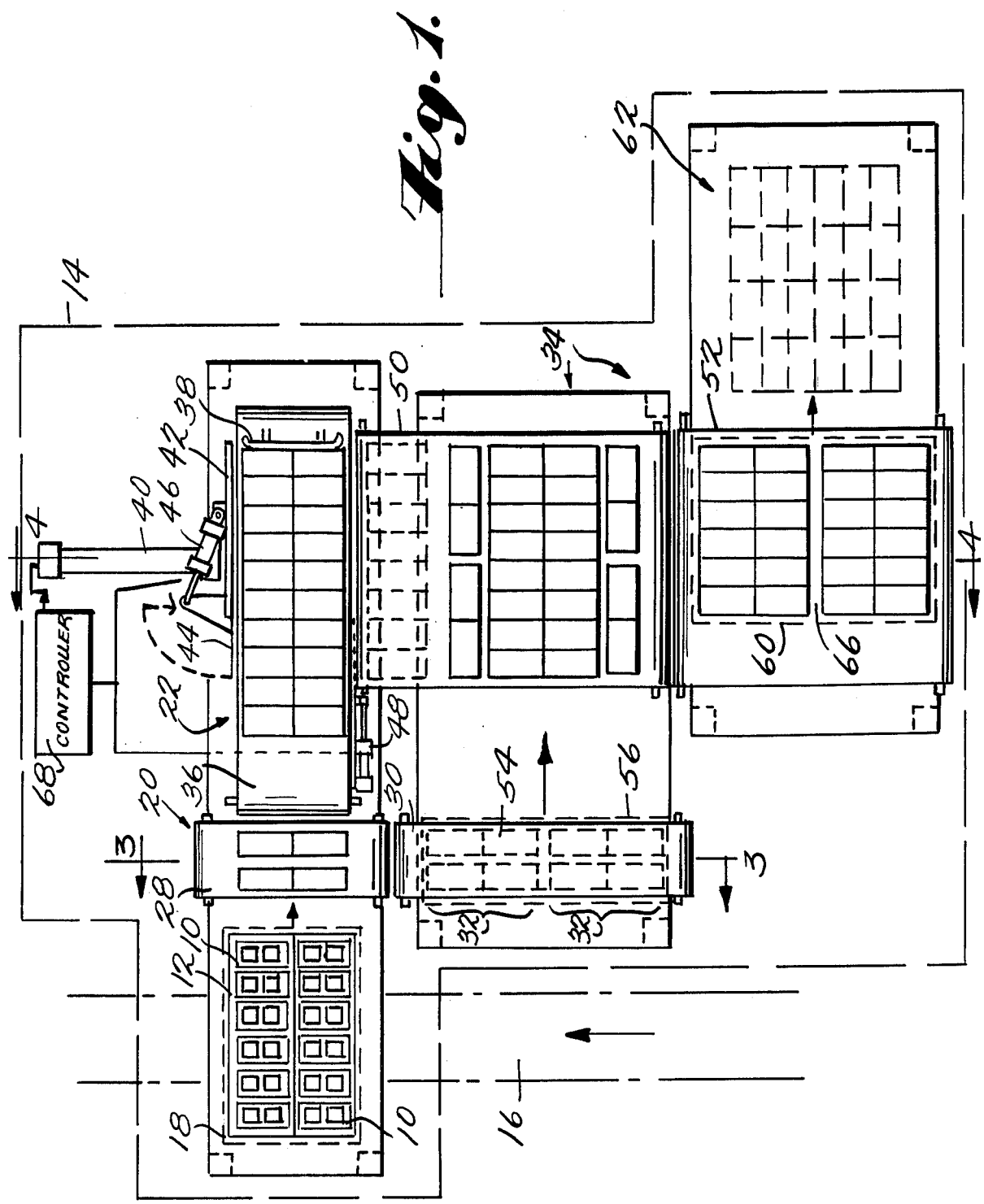
FIG. 1 is a plan view of the presently preferred exemplary embodiment of the invention.
Figure 2:
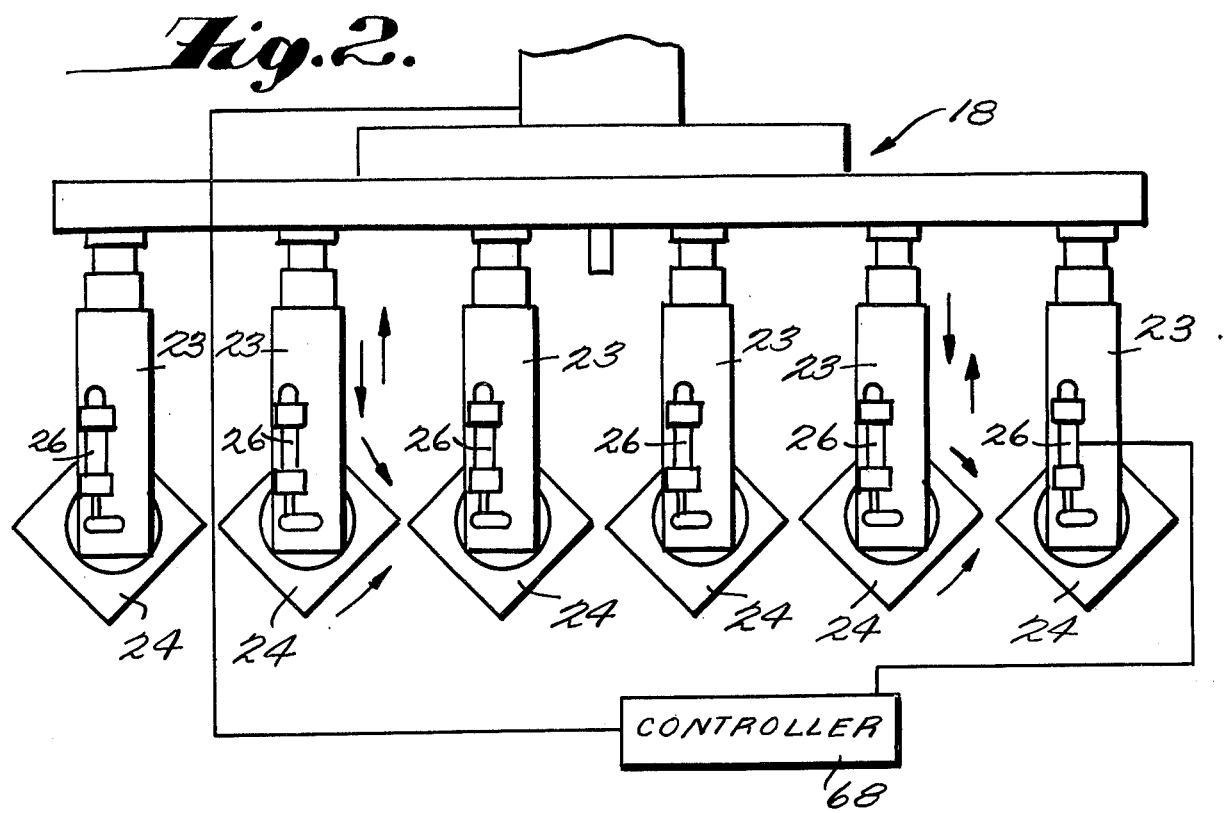
FIG. 2 is a side view of the depalletization gripper with rotating gripper pads for rotating the blocks in one degree of freedom.

As illustrated in FIG. 1, blocks 10 supported by pallet 12, are conveyed to the stacking apparatus 14 by conveyor 16, and are positioned as illustrated in FIG. 1. Depalletization gripper 18 (see FIG. 2) grips the ends of blocks 10 or the ends of rows of blocks 10, placed end to end, and transfers them to either grouping system 20 or grouping system 22. Arms 23 of depalletizing gripper 18 are equipped with rotating gripper pads 24 which are actuated by hydraulic or air cylinders 26, so that every row of blocks lifted from pallet 12 may be rotated 90° while being transferred to one of the grouping systems. Thus if blocks 10 originally have their apertured faces directed upwardly, they will have their solid faces directed upwardly on grouping systems 20 and 22. The gripping action of each of the individual gripper arms 23 is individually controlled, so that in each transfer circuit of gripper 18, certain rows of blocks may be deposited on grouping system 20, while the remaining rows are deposited on grouping system 22.

As illustrated in FIG. 3, grouping system 20 consists of conveyors 28 and 30, where, in operation, blocks are transferred from conveyor 28 to conveyor 30. The two conveyors are controlled in relative speeds so as to create spaces delineating rows 32 which can be gripped and transferred to marshalling area 34.

Grouping system 22 consists of conveyor 36, with stop 38 at its end, against which the blocks accumulate and become compacted together. Pusher 40, consisting of rigid pusher plate 42 and retractable pusher plate 44, hinged to rigid pusher plate 42, pushes the compacted blocks off of conveyor 36 onto marshalling area 34. Retractable pusher plate 44 is actuated by cylinder 46 so that, when activated, eight rows of blocks are pushed off conveyor 36, whereas, when not activated, only six rows of blocks are pushed off conveyor 36. Movable stop 48, controlled synchronously with cylinder 46, prevents more blocks than desired from being pushed off of conveyor 36.

Marshalling area 34 consists of conveyors 50 and 52, which are controlled similarly to the conveyors of grouping system 20, so that when blocks are pushed transversely off conveyor 36 onto conveyor 50, the independent control of pusher 40 and conveyors 50 and 52 introduce spaces between the rows so as to enable an appropriate gripper to transfer the blocks from marshalling area 34 onto a stack.

When blocks oriented 90° with respect to blocks pushed from conveyor 36 are desired on conveyor 50, two rows 54, of two blocks each, are transferred from conveyor 30 to conveyor 50 by means of rotating gripper 56 (see FIG. 4). Gripper 56 consists of pairs of gripper arms 58, each pair of arms 58 picking up a row of blocks 54. The two pairs of arms 58 can either be separated (as illustrated in solid lines in FIG. 4) so as to place the two rows 54 at separated positions, or be maintained together so that rows 54 are placed adjacently on conveyor 50 (as illustrated in broken lines).

After the flat has been entirely composed on conveyor 50 and transferred to conveyor 52, stacking gripper 60 picks up the flat and transfers it to stacking area 62. The stacking gripper 60 is capable of rotating about its central axis so that the orientation of the flat may be changed while it is being transferred from conveyor 52 to stacking area 62. Stacking gripper 60 is equipped with movable tongues 64 to be inserted in spaces 66 of the flats to prevent buckling of the flat upon transfer to the stack.

Figure 5:
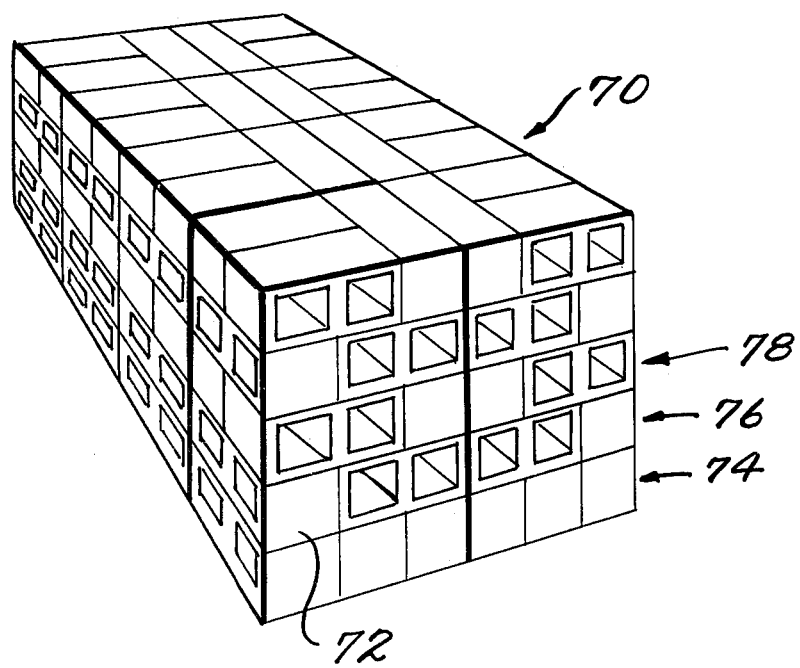
FIG. 5 is a perspective illustration of a typical tied stack of concrete blocks assembled with the present invention.

The above-described components are operated by controller 68 so as to form a tied stack 70 as illustrated in FIG. 5. Controller 68 can be conventionally designed as known in the art so as to sequentially activate the components in the manner described hereinafter or as otherwise desired for different types of stacking operations.

Subunit 72 (highlighted with bold lines in FIG. 5), and all similar subunits within stack 70 are tied in that each layer is adjacent to layers having a different block pattern so that contiguous blocks within each layer are held together due to frictional forces exerted by overlapping blocks in the adjacent layers. In the presently preferred exemplary embodiment, controller 68 is capable of producing three different layer patterns, i.e., layer type 74, layer type 76, and layer type 78 as illustrated in FIG. 5. The sequence of operations which results in tied stack 70 will now be described in detail.

In operation, conveyor 16 moves pallet 12 of blocks 10 into position as shown in FIG. 1. The six gripper arm pairs 23 of depalletization gripper 18 pick up the six rows of blocks 10 and rotate each row 90° so that a flat or solid surfaces faces upwards. Depalletization gripper 18 then transfers the six rows of blocks 10 to conveyor 36 of grouping system 22, which moves to compact the rows against stop 38.

Controller 68 then retracts pusher arm 44 and advances stop 48 so that pusher 40 is capable of pushing only six rows of blocks. These six rows of blocks are then pushed onto conveyor 50 of marshalling area 34 which transfers the rows to approximately the middle of conveyor 50 and stops.

The next pallet 12 of blocks 10 are brought into the position shown in FIG. 1 and the above-described process is repeated, so that both sets of six rows of blocks 10 are positioned on conveyor 50. Controller 68 then causes the transfer of the two sets of blocks onto conveyor 52, operating each conveyor 50 and 52 so as to leave the appropriate desired space between the two sets. Stacking gripper 60 then picks up the two sets of blocks, rotates the entire flat 90°, and sets the flat down to form bottom layer 74 of stack 70 in stacking area 62.

The next pallet 12 of bricks 10 is brought into position as indicated in FIG. 1, and depalletization gripper 18 lifts the six rows of bricks, rotates them 90°, and sets two of the rows on conveyor 28 of grouping system 20, and the remaining six rows on conveyor 36 of grouping system 22. Conveyors 28 and 30 operate together to convey the two rows of bricks to the first portion of conveyor 30 following which conveyors 30 and 28 stop. Conveyor 36 conveys the six rows of blocks until they are compacted by stop 38. Depalletization gripper 18 transfers the next set of six rows in a similar manner so that the end result is that two rows 54 of four bricks each are positioned on conveyor 30 as illustrated in FIG. 1 and eight rows of two bricks each are positioned on conveyor 36.

Controller 68 then positions retractable pusher plate 44 so that it is parallel with the rigid pusher plate 42, retracts stop 48, and activates pusher 40 that that eight rows of two bricks each are pushed onto conveyor 50 of marshalling area 34. Conveyor 50 advances the eight rows to the center of conveyor 50 and stops as shown in FIG. 1. Rotating gripper 56 then picks up the rows of blocks 54 on conveyor 30, spreads the previously adjacent rows 54, rotates them by 90° about a vertical axis, and sets rows of blocks 54 down on either side of the blocks previously pushed from conveyor 36 so as to form a pattern similar to that on conveyor 50 in FIG. 1. Conveyors 50 and 52 operate together to transfer the flat to conveyor 52 with the appropriate spaces 66 inserted in the process. Tongues 64 of stacking gripper 60 then spread to align with spaces 66 and stacking gripper 60 picks up the assembled flat and transfers it, without rotation, to stacking area 62 to form the second layer 76 of stack 70.

Depalletization gripper 18 and conveyors 28, 30 and 36 operate as described above so that four rows 54 of blocks 10 are positioned on conveyor 30 (as illustrated in FIG. 1) and eight rows of blocks 10 are positioned on conveyor 36. Controller 68 then activates cylinder 46 so that retractable pusher arm is parallel to rigid pusher arm 42, retracts stop 48, and commands pusher 40 to push half of each of the eight rows of blocks onto conveyor 50 (e.g. only one block for each row is transferred). Conveyor 50 then advances the eight blocks approximately two block widths and stops. Pusher 40 then pushes the remaining halves of the eight rows onto conveyor 50, and conveyor 50 moves both rows until they are centered on conveyor 50.

Rotating gripper 56 then picks up rows of blocks 54 from conveyor 30, rotates them 90°, and sets them down on conveyor 50 between the two sets of eight blocks each, so as to form a flat similar to layer 78 of stack 70 in FIG. 5. Conveyors 50 and 52 operate together to transfer the flat from conveyor 50 to conveyor 52 leaving the appropriate spaces 66 for the insertion of tongues 27 of stacking gripper 60. Stacking gripper 60 then transfers the completed flat to stacking area 62 and places it, without rotation, upon the stack as third layer 78 of stack 70.

Controller 68 then forms alternating layers similar to layers 76 and 78, formed as described above, until a stack of the desired height is formed.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention as defined in the following claims.

What is claimed is:

1. Apparatus for forming tied stacks of block-like objects comprising:
    a first grouping means;
    a second grouping means;
    means for supplying said objects to said first and second grouping means;
    a marshalling area disposed to receive said objects from either of said first and second grouping means;
    a first transfer means for transferring said objects on said first grouping means to said marshalling area and depositing said objects having been transferred at preselected locations on said marshalling area in a first angular orientation;
    a second transfer means for transferring said objects on said second grouping means to said marshalling area and depositing said objects having been transferred at preselected locations on said marshalling area in a second angular orientation, different from said first angular orientation, thus forming a layer of said objects;
    stacking means for lifting said layer from said marshalling area and positioning said layer on a stacking area in the same pattern in which said objects were arranged on said marshalling area so that a stack is formed with consecutive layers of said objects lifted from said marshalling area; and
    control means for controlling the sequential operation of the aforesaid apparatus so that at least two different patterns of layers are successively added to assemble a tied stack in said stacking area.

2. Apparatus as in claim 1 wherein said first grouping means comprises:
    a first conveyor means for moving said objects in a first direction, therealong with said objects being oriented in a plurality of rows aligned transverse to said first direction; and
    a stop placed at the end of said first conveyor means for accumulating said transversely oriented rows thereon in a predetermined position.

3. Apparatus as in claim 2 wherein said second grouping means comprises:
    a second conveyor means for moving said objects in a second direction therealong, perpendicular to said first direction, with the objects being oriented in a plurality of rows aligned parallel to said second direction; and
    a third conveyor means disposed downstream of said second conveyor means for moving said objects in said second direction therealong as received from said second conveyor, the motion of said third conveyor means being controlled independently from the motion of said second conveyor means so as to space the objects on said third conveyor means in a predetermined manner.

4. Apparatus as in claim 3 wherein said marshalling area comprises:
    a fourth conveyor means for moving said objects parallel to said second direction; and
    a fifth conveyor means disposed downstream of said fourth conveyor means for moving said objects parallel to said second direction therealong as received from said fourth conveyor means, the motion of said fifth conveyor means being controlled independently from the motion of said fourth conveyor means so as to space the objects on said fifth conveyor means in a predetermined manner.

5. Apparatus as in claim 4 wherein said first transfer means comprises:
    a rigid pusher plate aligned with the first six rows of said objects as stopped by said stop for pushing said objects transversely from said first conveyor means to said marshalling area;
    An auxiliary retractable pusher plate capable of selective alignment with the next adjacent two rows of said objects on said first conveyor means;
    means for adjusting the position of said retractable pusher plate to selectively push said next adjacent two rows when the rigid pusher plate pushes said first six rows;
    means for driving said rigid pusher plate and said retractable pusher plate so that said first six rows, and selectively said next two rows, are pushed from said first conveyor means onto said fourth conveyor means upon command from said controller; and
    adjustable stopping means, on the side of said first conveyor means opposite said first transfer means, controlled synchronously with said auxiliary retractable pusher plate, for prohibiting more of said objects than desired from being pushed off of said first conveyor means; and wherein
    said fourth conveyor means is positioned with respect to said first conveyor means so that when said objects are pushed transversely from said first conveyor means, said objects move directly onto the receiving end of said fourth conveyor means.

6. Apparatus as in claim 4 wherein said second transfer means comprises:
    a plurality of pairs of gripper assemblies, each of said assembly pairs being able to pick up a row of at least two said objects;

means for modifying the distance between said pairs of gripper assemblies so that the distance between said rows can be adjusted when said rows are picked up; and means for rotating said second transfer means so that said rows can be set down in a different relative angular orientation from which said rows were picked up.

7. Apparatus as in claim 4 wherein said stacking means comprises:

a stacking gripper capable of lifting an entire layer of said objects from said marshalling area; and means for rotating said stacking gripper selectively so that the relative angular orientation of said layer as lifted from said fifth conveyor means may be altered before said layer is placed in said stacking area.

8. Apparatus as in claim 1 wherein said means for supplying is a gripper comprising:

a plurality of pairs of opposed gripper arms;

a plurality of gripper pads, attached to each of said gripper arms, said gripper pads coming in contact with said objects as controlled by movements of said gripper arms, each pair of gripper arms with the attached gripper pads being capable of lifting a row of said objects; and means for rotating said gripper pads by substantially 90° while the objects are lifted so that said objects are rotated to present a predetermined face orientation when lowered and released onto said first and second grouping means.

9. Apparatus as in claim 8 wherein at least some pairs of gripper arms are controlled independently of the other pairs so that said means for supplying is capable of picking up, lowering and releasing said objects to selectively supply said first and second grouping means.

10. Apparatus as in claim 1 wherein:

said first and said second transfer means and said stacking means each move all the required said objects from an initial position to a respectively associated final position in one cycle of operation; and said means for supplying moves all of said objects necessary to form one layer to said first and second grouping means with at most two cycles of operation.

11. Apparatus as in claim 1 wherein said block-like objects are concrete blocks.

12. Apparatus as in claim 1 wherein said control means forms at least two different patterns with said objects on said marshalling area.

13. Apparatus for forming tied stacks of block-like objects from an unloading area where said objects to be stacked are located, said apparatus comprsing:

a first grouping means;

a second grouping means;

supply means for taking a predetermined number of objects from said unloading area and placing a portion of said objects onto said first grouping means and the remaining of said predetermined number of objects onto said second grouping means;

a marshalling area;

a first transfer means for transferring at least some of said objects on said first grouping means to said marshalling area and depositing said objects having been transferred at preselected locations on said marshalling area in a first angular orientation.

a second transfer means for transferring at least some of said objects on said second grouping means to said marshalling area and depositing said objects having been transferred at preselected locations on said marshalling area in a second angular orientation, different from said first annular orientation;

a stacking area;

stacking means for lifting said objects from said marshalling area and positioning said objects from said marshalling area on said stacking area in the same pattern in which said objects were arranged on said marshalling area so that a stack is formed with the consecutive layers of said objects lifted from said marshalling area, said stacking means being capable of altering the relative angular orientation of said same pattern;

control means for controlling the operation of said apparatus so that at least two different patterns are formed with said objects on said marshalling area, said patterns being such tat tied stacks are assembled in said stacking area;

said first and second transfer means and said stacking means each moving all of the required said objects from an initial position to a respectively associated final position simultaneously; and said supply means moving all of said objects necessary to form one layer to said first and second grouping means with at most tow departures from said unloading area.

14. Method for forming tied stacks of block-like objects including the steps of:

a. placing a portion of said objects from an unloading area onto a first grouping means and others of said objects in said unloading area onto a second grouping means;

b. transferring at least a portion of said objects on said first grouping means to a marshalling area and depositing said objects having been transferred at preselected locations on said marshalling area in a first angular orientation;

c. transferring at least a portion of said objects on said second grouping means to said marshalling area and depositing said objects having been transferred at preselected locations on said marshalling area in a second angular orientation, different from said first annular orientation;

lifting siad objects from said marshalling area and positioning said objects from said marshalling area onto a stacking area in the same pattern in which said objects were arranged on said marshalling area so that a stack is formed with the consecutive layers of said objects lifted from said marshalling area; and controlling the sequence of the aforesaid steps in succession so that at least two different successive patterns of layers are formed with said objects on said marshalling area, said pattern being such that tied stacks are assembled in said stacking area.

15. Method as in claim 14 wherein said placing step further includes rotating said objects at least 90° so that a predetermined face of said object is directed upwardly.

16. Method as in claim 14 wherein said transferring and depositing step b further includes:

pushing a number of said objects, said number selected by said controlling step, from said first grouping means to said marshalling area; and preventing more than said number of said objects from being pushed.

17. Method as in claim 14 wherein said transferring and depositing step c further includes:
grasping at least two rows of at least two said objects;
lifting said rows;
modifying the distance between said rows after said rows are lifted;
rotating said rows so that said rows assume an angular orientation different relative to the angular orientation in which they were lifted; and
placing said rows on said marshalling area in said different angular orientation.

18. Method as in claim 14 wherein said lifting and positioning step further includes:
lifting an entire layer of said stack from said marshalling area;
selectively rotating said layer so that the relative angular orientation of said layer as lifted from said marshalling area may be altered; and
placing said layer in said stacking area.

19. Method as in claim 14 wherein:
said transferring and depositing steps b and c, and said lifting and positioning step each move all the required said objects from an initial position to a respectively associated final position in one cycle of operation; and
said placing step moves all of said objects necessary to form one layer to said first and second grouping means with at most two cycles of operation.

20. Method for forming tied stacks of block-like objects including the steps of:
a. placing at least a portion of said objects from an unloading area onto a first grouping means and others of said objects in said unloading area onto a second grouping means;
b. transferring at least a portion of said objects on said first grouping means to a marshalling area and depositing said objects having been transferred at preselected locations on said marshalling area in a first angular orientation;
c. transferring at least a portion of said objects on said second grouping means to said marshalling area and depositing said objects having been transferred at preselected locations on said marshalling area in a second angular orientation, different from said first annular orientation;
d. lifting said objects from said marshalling area and positioning said objects from said marshalling area onto a stacking area in the same pattern in which said objects were arranged on said marshalling area so that a stack is formed with the consecutive layers of said objects lifted from said marshalling area;
e. controlling the sequence of the aforesaid steps in succession so that at least two different successive patterns of layers are formed with said objects on said marshalling area, said patterns being such that tied stacks are assembled in said stacking area;
f. said transferring and depositing steps b and c, and said lifting and positioning step each moving all the required said objects from an initial position to a respectively associated final position in one cycle of operation; and
g. said placing step moving all of said objects necessary to form one layer to said first and second grouping means with at most two cycles of operation.

* * * * *